US010374791B2

United States Patent
Teper et al.

(10) Patent No.: US 10,374,791 B2
(45) Date of Patent: Aug. 6, 2019

(54) METHOD OF PROTECTING ELECTRONIC CIRCUIT AGAINST EAVESDROPPING BY POWER ANALYSIS AND ELECTRONIC CIRCUIT USING THE SAME

(71) Applicant: Winbond Electronics Corp., Taichung (TW)

(72) Inventors: Valery Teper, Taichung (TW); Nir Tasher, Taichung (TW)

(73) Assignee: Winbond Electronics Corp., Taichung (TW)

( * ) Notice: Subject to any disclaimer, the term of this patent is extended or adjusted under 35 U.S.C. 154(b) by 124 days.

(21) Appl. No.: 15/285,466

(22) Filed: Oct. 4, 2016

(65) Prior Publication Data

US 2017/0214520 A1 Jul. 27, 2017

(30) Foreign Application Priority Data

Jan. 26, 2016 (IL) .......................................... 243789

(51) Int. Cl.
*G06F 1/12* (2006.01)
*H04L 9/00* (2006.01)
(Continued)

(52) U.S. Cl.
CPC ................ *H04L 9/003* (2013.01); *G06F 1/12* (2013.01); *G09C 1/00* (2013.01); *H04L 9/0618* (2013.01); *H04L 2209/08* (2013.01)

(58) Field of Classification Search
CPC ... H04L 9/003; H04L 9/0618; H04L 2209/08; G09C 1/00; G06F 1/12
See application file for complete search history.

(56) References Cited

U.S. PATENT DOCUMENTS 8,031,540 B2 * 10/2011 Pickles ................ G11C 7/1006
365/194
2011/0252244 A1 * 10/2011 Lesea ...................... G06F 21/72
713/192
(Continued)

FOREIGN PATENT DOCUMENTS

KR     20080021520      3/2008
TW        201537332    10/2015

OTHER PUBLICATIONS

Bucci et al., "A countermeasure against differential power analysis based on random delay insertion," IEEE nternational Symposium on Circuits and Systems, 2005. ISCAS, May 23-26, 2005. pp. 3547-3550 (Year: 2005).*

(Continued)

*Primary Examiner* — Khoi V Le
(74) *Attorney, Agent, or Firm* — JCIPRNET

(57) ABSTRACT

An electronic circuit with protection against eavesdropping by power analysis is provided. The electronic circuit includes: a storage element for storing a set of bits; a logic unit for processing the stored set of bits and providing a next state set of bits after two or more cycles, wherein in a first cycle, some of the stored set of bits are provided to the logic unit correctly and some are replaced by random values and in a last cycle, all of the stored set of bits are provided to the logic unit correctly; and a random bit generator that generates a random bit for each bit of the stored set of bits to determine which bits of the stored set of bits are to be provided correctly and which bits are to be replaced in each cycle.

19 Claims, 8 Drawing Sheets

(51) Int. Cl.
  *H04L 9/06* (2006.01)
  *G09C 1/00* (2006.01)

(56) References Cited

U.S. PATENT DOCUMENTS

2012/0174234 A1    7/2012   Bancel
2012/0204056 A1*   8/2012   Airaud ................... G06F 21/75
                                                      713/401
2013/0322462 A1*  12/2013   Poulsen ................. H04J 3/06
                                                      370/458

OTHER PUBLICATIONS

Bucci et al., "A countermeasure against differential power analysis based on random delay insertion," IEEE International Symposium on Circuits and Systems, 2005 (ISCAS), May 23-26, 2005. pp. 3547-3550 (Year: 2005).*

M. Bucci et al., "A countermeasure against differential power analysis based on random delay insertion," IEEE International Symposium on Circuits and Systems, 2005. ISCAS, May 23-26, 2005. pp. 3547-3550.

"Search Report of Europe Counterpart Application," dated May 18, 2017, p. 1-p. 8, in which the listed references were cited.

"Office Action of Korea Counterpart Application", with English translation thereof, dated May 29, 2018, p. 1-p. 10.

"Office Action of Taiwan Counterpart Application", dated May 7, 2018, p. 1-p. 5.

"Office Action of Korea Counterpart Application," dated Nov. 27, 2018, with English translation thereof, p. 1-p. 11.

Luca Benini, et al., "Energy-Aware Design Techniques for Differential Power Analysis Protection," Design Automation Conference, Jun. 2003, pp. 36-41.

* cited by examiner

METHOD OF PROTECTING ELECTRONIC CIRCUIT AGAINST EAVESDROPPING BY POWER ANALYSIS AND ELECTRONIC CIRCUIT USING THE SAME

CROSS-REFERENCE TO RELATED APPLICATION

This application claims the priority benefit of Israel application serial no. 243789, filed on Jan. 26, 2016. The entirety of the above-mentioned patent application is hereby incorporated by reference herein and made a part of this specification.

BACKGROUND OF THE INVENTION

1. Field of the Invention

The invention relates to countermeasures for preventing determination of cryptographic keys by power analysis of a cryptographic device.

2. Description of Related Art

Near the end of the $20^{th}$ century, it was discovered that information from a cryptographic device (e.g. a smartcard reader) can be revealed non-intrusively by analysis of the power consumption of the device. Examples of methods of power analysis are known as Simple Power Analysis (SPA) and Differential Power Analysis (DPA). SPA involves visual examination of graphs of the current used by a device as a function of time. As an example, when a complementary metal oxide semiconductor (CMOS) logic circuit changes from a logic 0-state to a logic 1-state, a significant amount of electrical current is drawn from the power supply, whereas in the opposite case a negligible amount is drawn. Likewise, a microprocessor will have different power consumption profiles for different commands. Therefore, in a power trace from a smartcard performing a data encryption standard (DES) encryption, the different rounds can be clearly seen. Also, squaring and multiplication operations of an RSA implementation can be distinguished, thus enabling an eavesdropper to compute the secret key.

DPA statistically analyzes power consumption of a cryptographic device. DPA records the power consumption over many rounds and can then remove noise that would prevent analysis based on SPA.

One method of protecting against power analysis is based on hiding the calculation. This method includes designing the cryptographic device to have a uniform or random power consumption regardless of the operations being performed, for example by adding randomness to the leakage signal or complementing the calculation signal to achieve the uniform power consumption.

An alternative method for protecting the cryptographic device is by masking the calculation. In this method, the cryptographic device is designed to add randomness to the calculation (e.g. additional unnecessary calculations to be performed with the calculation) so that the power consumption is different for each round even if the same data is analyzed.

Other methods add random noise and/or randomize the signal clock to make it harder for the calculation to be identified by DPA.

Typically, each method of protecting the cryptographic device is associated with a level of complexity and may be overcome if enough effort is invested. Therefore, it is of interest to find more complex methods to prevent the method from being cracked.

SUMMARY OF THE INVENTION

An aspect of an embodiment of the disclosure relates to an electronic circuit and method of protecting a logic calculation that is performed on a set of bits from being deciphered by analysis of the power consumption of the circuit. The method includes dividing the calculation into two or more stages so that the calculation is performed in two or more clock cycles instead of one. In the first cycle, part of the bits are provided to a logic unit of the circuit and part of the bits are replaced with random values. The logic unit calculates a first result from the partial data. Then, in the next cycle or cycles, the correct data of the replaced bits are provided to the logic unit. The logic unit calculates additional results with the correct data. The additional results are provided to a storage element to serve as a set of bits for a next state of the circuit.

In an exemplary embodiment of the disclosure, the circuit randomly selects half of the bits for the first cycle or the reciprocal of the number of cycles. Alternatively, the circuit selects a random number of bits for the first cycle and the additional cycles. In some embodiments of the disclosure, in the next cycle or cycles, the bits are provided from an intermediate storage unit so that the storage element may be changed by the calculation of the logic unit in the first cycle.

There is thus provided according to an exemplary embodiment of the disclosure, an electronic circuit with protection against eavesdropping by power analysis. The electronic circuit includes a storage element for storing a set of bits corresponding to correct values, a logic unit for processing the stored set of bits and providing a next state set of bits after two or more cycles, and a random bit generator. In addition, in a first cycle, some of the stored set of bits are provided to the logic unit correctly and some are replaced by random values, and in a last cycle, all of the stored set of bits are provided to the logic unit correctly. The random bit generator generates a random bit for each bit of the stored set of bits to determine which bits of the stored set of bits are to be provided correctly and which bits are to be replaced in each cycle.

In an exemplary embodiment of the disclosure, the electronic circuit is driven by two clock signals, and one of the clock signals is with half a frequency of the other. Optionally, the circuit includes an intermediate storage unit associated with the storage element for storing the correct values of the stored set of bits for use in the last cycle. In an exemplary embodiment of the disclosure, the circuit includes a selector associated with the storage element and the random bit generator for each bit of the stored set of bits. In addition, the selector is controlled by the random bits to select between the correct value and the random value. Optionally, the stored set of bits are stored in the storage element in an encrypted form. In an exemplary embodiment of the disclosure, the stored set of bits are decrypted when provided to the logic unit. Optionally, in a second cycle, the replaced bits corresponding to the random values are further replaced with the corresponding ones of the correct values and provided to the logic unit. In an exemplary embodiment of the disclosure, half of the bits are replaced by random values in the first cycle. Optionally, a random number of bits are replaced by random values in the first cycle. In an exemplary embodiment of the disclosure, the bits that are randomly selected to be replaced are set to be opposite values of corresponding ones of the correct values.

There is further provided according to an exemplary embodiment of the disclosure, a method of protecting an electronic circuit against eavesdropping by power analysis.

The method includes: storing an initial set of bits corresponding to correct values to a storage element; generating a random bit for each bit of the stored set of bits; in a first cycle, providing correctly some of the bits from the storage element to a logic unit and replacing rest of the bits by random values; in a last cycle, providing all of the stored set of bits correctly to the logic unit; and processing all of the stored set of bits in the last cycle to provide a next state set of bits.

In an exemplary embodiment of the disclosure, the circuit is driven by two clock signals, and one of the clock signals is with half a frequency of the other. Optionally, the method further includes storing the correct values of the stored set of bits for use in the last cycle to an intermediate storage unit associated with the storage element. In an exemplary embodiment of the disclosure, the method further includes selecting between the correct value and the random value according to the random bit by a selector for each bit of the stored set of bits. Optionally, the step of storing an initial set of bits further includes encrypting the stored set of bits, and the step of providing all of the stored set of bits to the logic unit in the last cycle further includes decrypting the stored set of bits. Optionally, the step of providing all of the stored set of bits to the logic unit in the last cycle further includes obtaining the some of the bits from the storage element in the first cycle and replacing the rest of the bits which has been replaced by the random values in the first cycle with the corresponding ones of the correct values. In an exemplary embodiment of the disclosure, half of the bits are replaced by the random values in the first cycle. Optionally, a random number of bits are replaced by the random values in the first cycle. In an exemplary embodiment of the disclosure, the bits that are randomly selected to be replaced are set to be opposite values of corresponding ones of the correct values.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
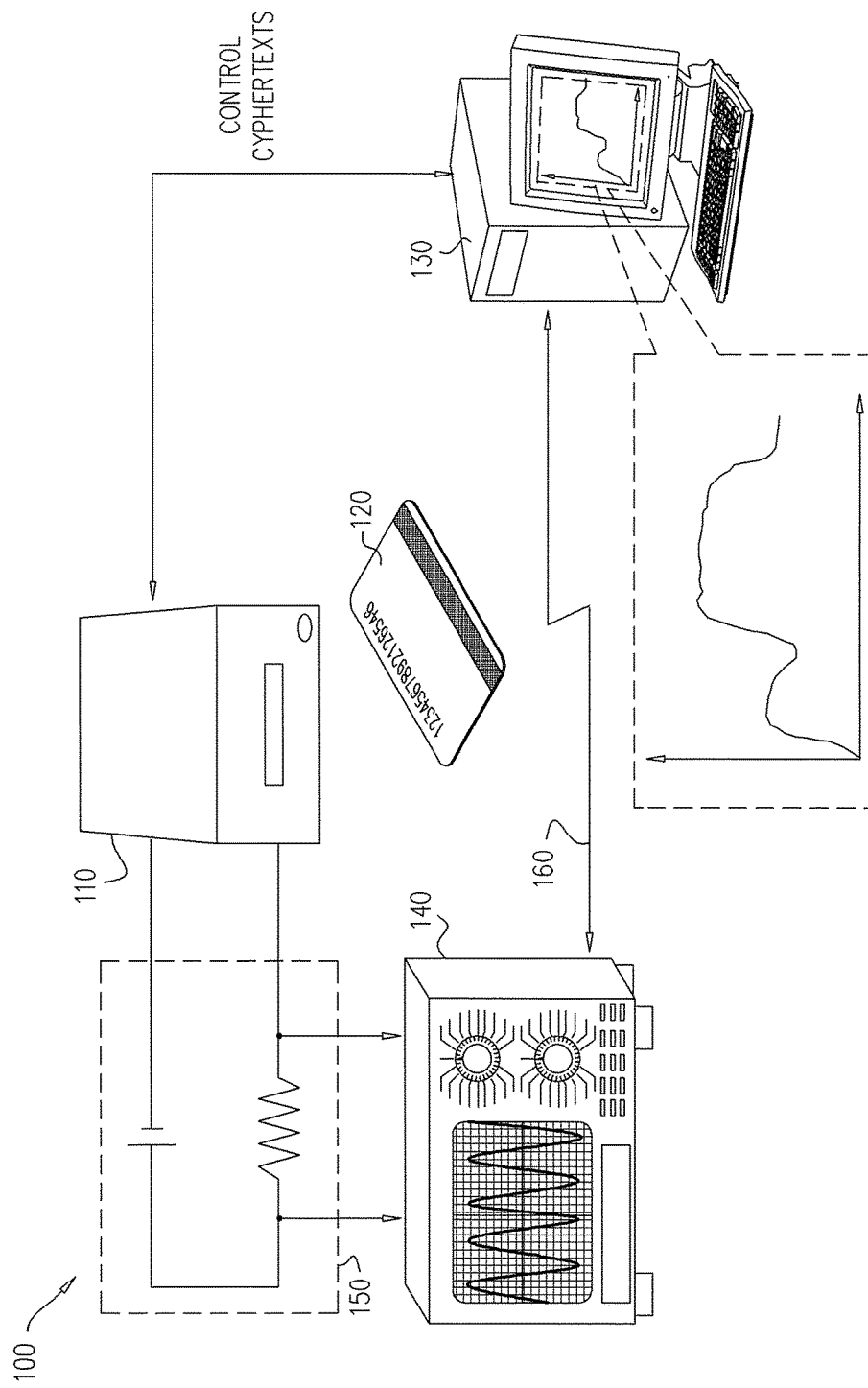
FIG. 1 is a schematic illustration of a system for performing a power attack on a cryptographic device according to an exemplary embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a schematic illustration of a system 100 for performing a power attack on a cryptographic device 110 according to an exemplary embodiment of the disclosure. In an exemplary embodiment of the disclosure, an oscilloscope 140 or other power measurement device may be used to monitor a power input 150 of the cryptographic device 110. Optionally, the cryptographic device 110 may be a card reader (e.g. for reading a smart card 120), a chip in a circuit or other implementations.

In an exemplary embodiment of the disclosure, a general purpose computer 130 is programed to communicate with the cryptographic device 110, for example to provide instructions to the cryptographic device 110 and receive unencrypted transaction information. Optionally, during use, the cryptographic device 110 reads encrypted information e.g. from a smartcard 120 and provides unencrypted information to the computer 130 to perform a transaction. In an exemplary embodiment of the disclosure, the oscilloscope 140 monitors the power consumption of the cryptographic device 110 and provides a recorded signal 160 to the computer 130 for analysis. Optionally, based on the information from the cryptographic device 110 and/or the oscilloscope 140, the computer 130 can determine the cryptographic keys or other confidential information used in encrypting the information.

Figure 2:
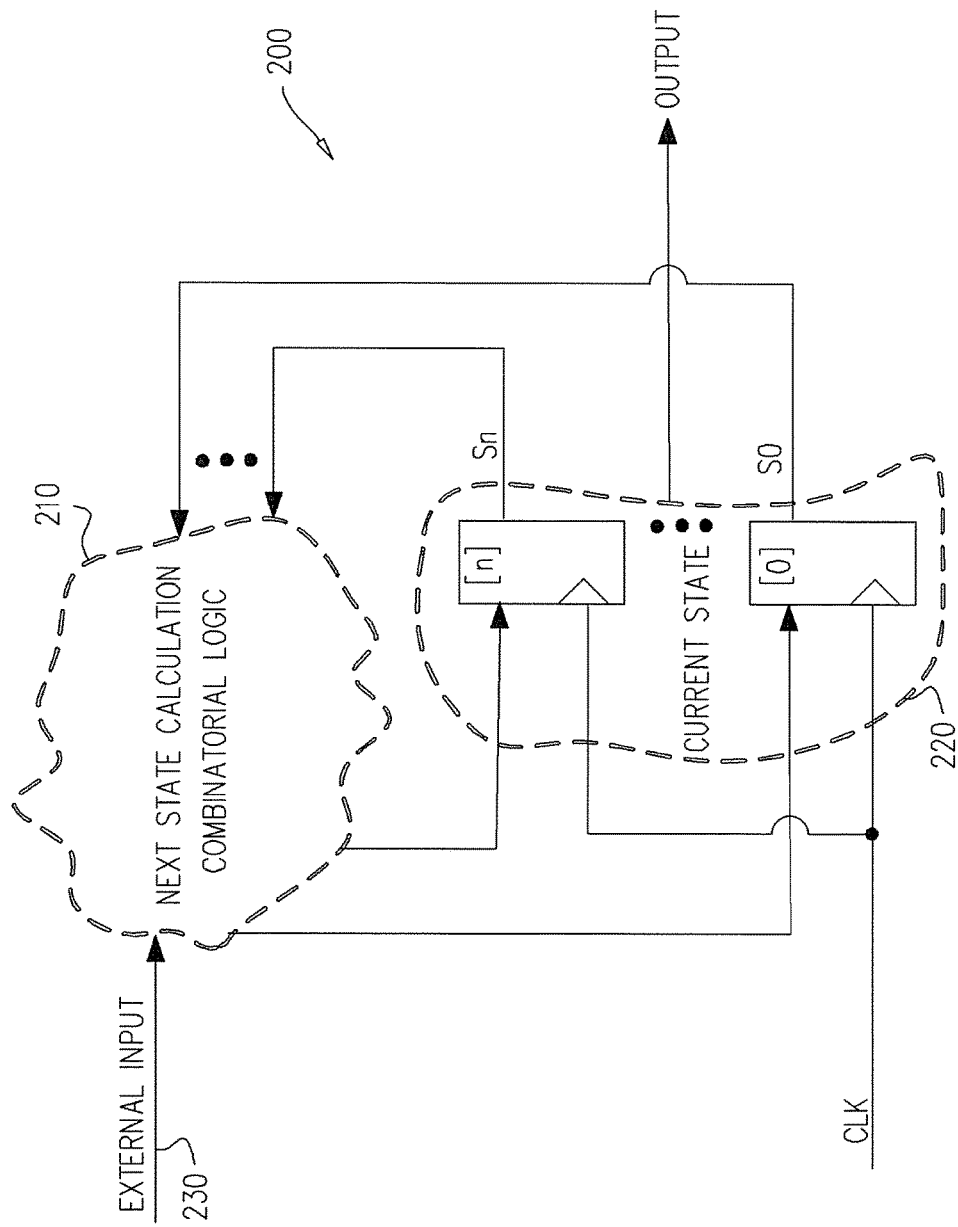
FIG. 2 is a schematic illustration of a logic circuit of a cryptographic device according to an exemplary embodiment of the disclosure.

FIG. 2 is a schematic illustration of a logic circuit 200 of the cryptographic device 110 according to an exemplary embodiment of the disclosure. In an exemplary embodiment of the disclosure, the logic circuit 200 includes storage elements 220 (flip-flops S0 . . . Sn) for storing a current value/state and a combinatorial logic unit 210 that accepts data from the storage elements 220 and calculates a next value/state, and the next value/state is stored back to the storage elements. In an exemplary embodiment of the disclosure, the logic circuit 200 is initially provided with an external input value 230, for example values that are read from a smart card. Optionally, the logic circuit 200 performs one or more cycles of processing by producing a few generations of next values from the external input value 230 and then outputting the processed/decrypted value, for example to the computer 130.

Figure 3:
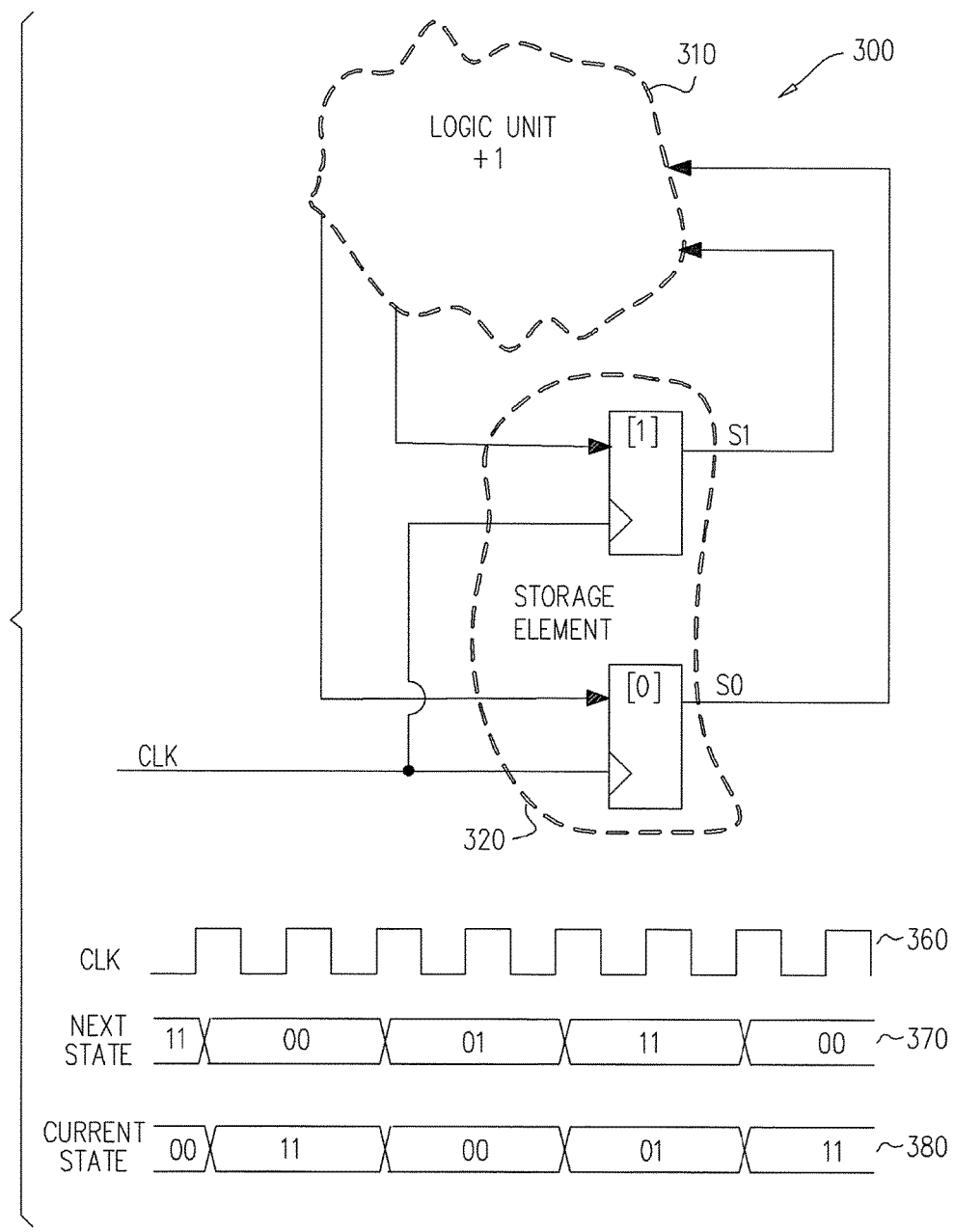
FIG. 3 is a schematic illustration of a two bit logic circuit of a cryptographic device according to an exemplary embodiment of the disclosure.

FIG. 3 is a schematic illustration of a two bit logic circuit 300 of the cryptographic device 110 according to an exemplary embodiment of the disclosure. In an exemplary embodiment of the disclosure, the logic circuit 300 includes a storage element 320 with two flip flops (S0 and S1) for storing the current state and a combinatorial logic unit 310 that in this case increments the storage value by 1 and stores the incremented values as the next state back into the storage element 320. A time line 360 shows the clock values of a clock signal CLK that drives the logic circuit 300 and time lines 370 and 380 show the values stored in the storage element 320 for the next state and current state respectively. In this case, a simple counter that counts from 0 to 3 is implemented by the logic circuit 300.

In an exemplary embodiment of the disclosure, there are two locations that are vulnerable with respect to a power attack and may serve as potential leaks for the content of the logic circuit (e.g. 200 and 300). The first location is from the logic unit (e.g. 210, 310) during calculation of the next value/state, and the second location is when updating the storage, e.g. when storing the next value/state back into the storage element (e.g. 220, 320). In an exemplary embodiment of the disclosure, to prevent an eavesdropper from using power analysis to determine the current contents of the logic circuit, the calculation is split into two or more cycles.

Figure 4:
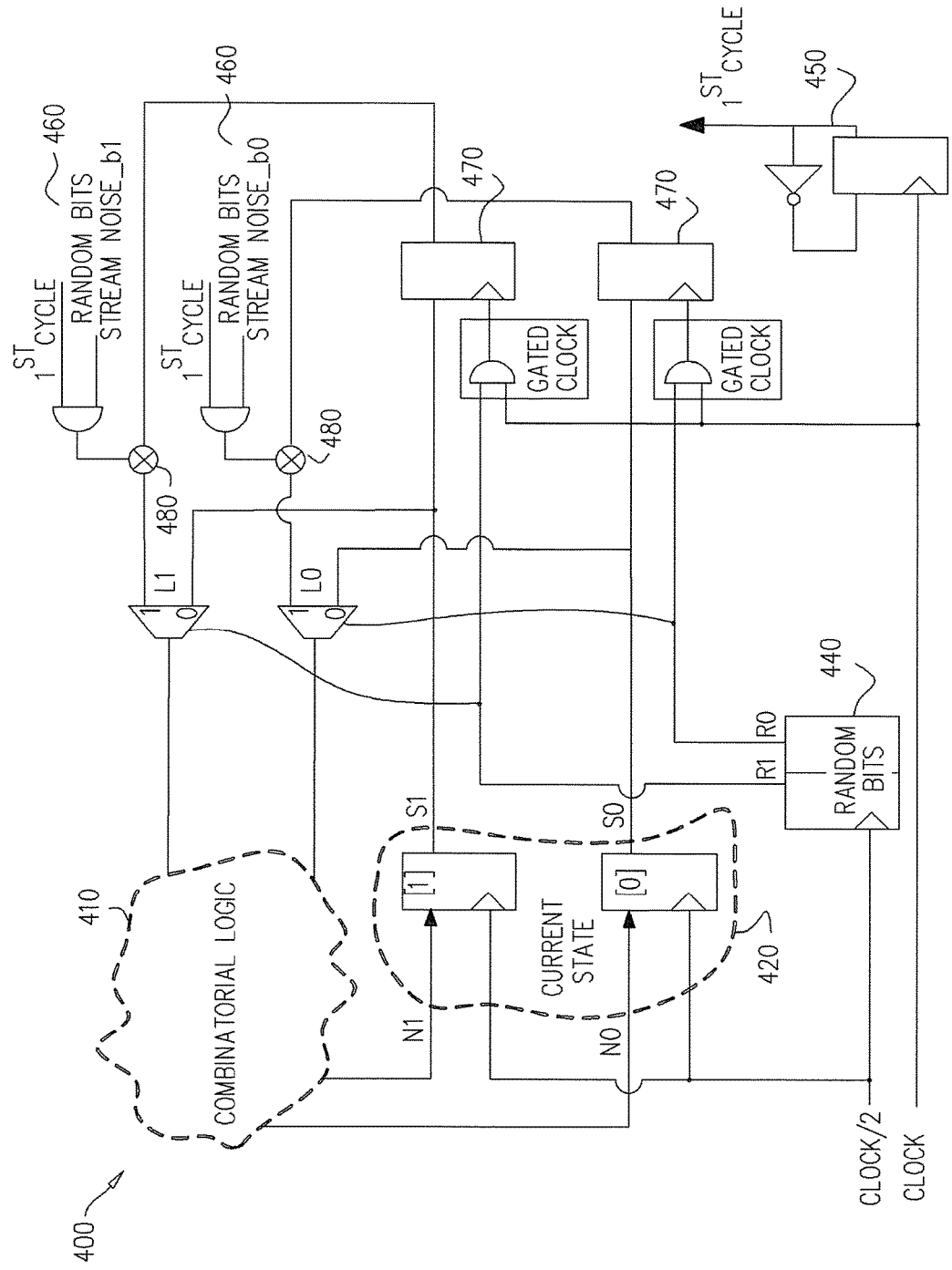
FIG. 4 is a schematic illustration of an enhanced logic circuit of a cryptographic device according to an exemplary embodiment of the disclosure.

FIG. 4 is a schematic illustration of an enhanced logic circuit 400 of the cryptographic device 110 according to an exemplary embodiment of the disclosure. In an exemplary embodiment of the disclosure, the enhanced logic circuit 400 includes a storage element 420 with two or more flip flops (S0, S1 . . . Si . . . Sm, only S0 and S1 are shown for simplicity). The logic circuit 400 also includes a combinatorial logic unit 410 that provides next state bits N0, N1 . . . Ni . . . Nm in response to its input (only N0 and N1 are shown for simplicity).

In an exemplary embodiment of the disclosure, the logic circuit 400 includes a random bit generator 440 that provides m random bits (R0, R1 . . . Ri . . . Rm) like the storage element 420. Optionally, a random bit Ri having a value of zero signifies that the bit stored in the flip flop Si is to be transferred to the logic unit 410 in a first cycle, whereas a random bit Ri having a value of one signifies that the bit stored in the flip flop Si is to be transferred to the logic unit 410 only in a second cycle. The random bits Ri randomly select 1 or more or of bits stored in the flip flops S0 to Sm to be processed by the combinatorial logic unit 410 in the first cycle and select the rest bits to be processed by the combinatorial logic unit 410 only in the second cycle. Optionally, the random bit generator 440 may provide a random bit sequence in which half of the bits are zero so that half of the bits are processed in the first cycle and then all of the bits are processed in the second cycle. This splits up the calculation processed by the combinatorial logic unit 410 into two cycles and protects the calculation from being deciphered by power analysis. In some embodiments of the disclosure, the calculation may be split into more than two cycles.

In an exemplary embodiment of the disclosure, a selector Li (L0 and L1 are shown in FIG. 4) is provided for each bit stored in the flip flop Si. Optionally, when the random bit Ri is zero the selector transfers the correct value of the bit stored in the flip flop Si to the combinatorial logic unit 410. However when Ri is 1 then in the first cycle, a random value (Ri, e.g. R0 and R1 shown in FIG. 4) is provided to the combinatorial logic unit 410 from a random stream 460 by an XOR gate 480 and in the second cycle, the bit stored in the flip flop Si is transferred to the combinatorial logic unit 410. Optionally, the random values are the same (Ri) as provided by the random bit generator 440 or they may come from a distinct random bit generator. Likewise, the bits that are randomly selected to be replaced may be set to the opposite value of the correct value (e.g. one instead of zero and zero instead of one). In an exemplary embodiment of the disclosure, the enhanced logic circuit 400 includes an indicator 450 that provides a value of 1 for the first cycle and a value of zero for the second cycle. Optionally, in the first cycle, the value of 1 enables a random value to be provided to the selector Li and then provided to the combinatorial logic unit 410 if Ri has a value of 1. In an exemplary embodiment of the disclosure, intermediate storage units 470 are provided to preserve the value of the bit stored in the flip flop Si for the second cycle in the case that Ri is 1.

Figure 5:
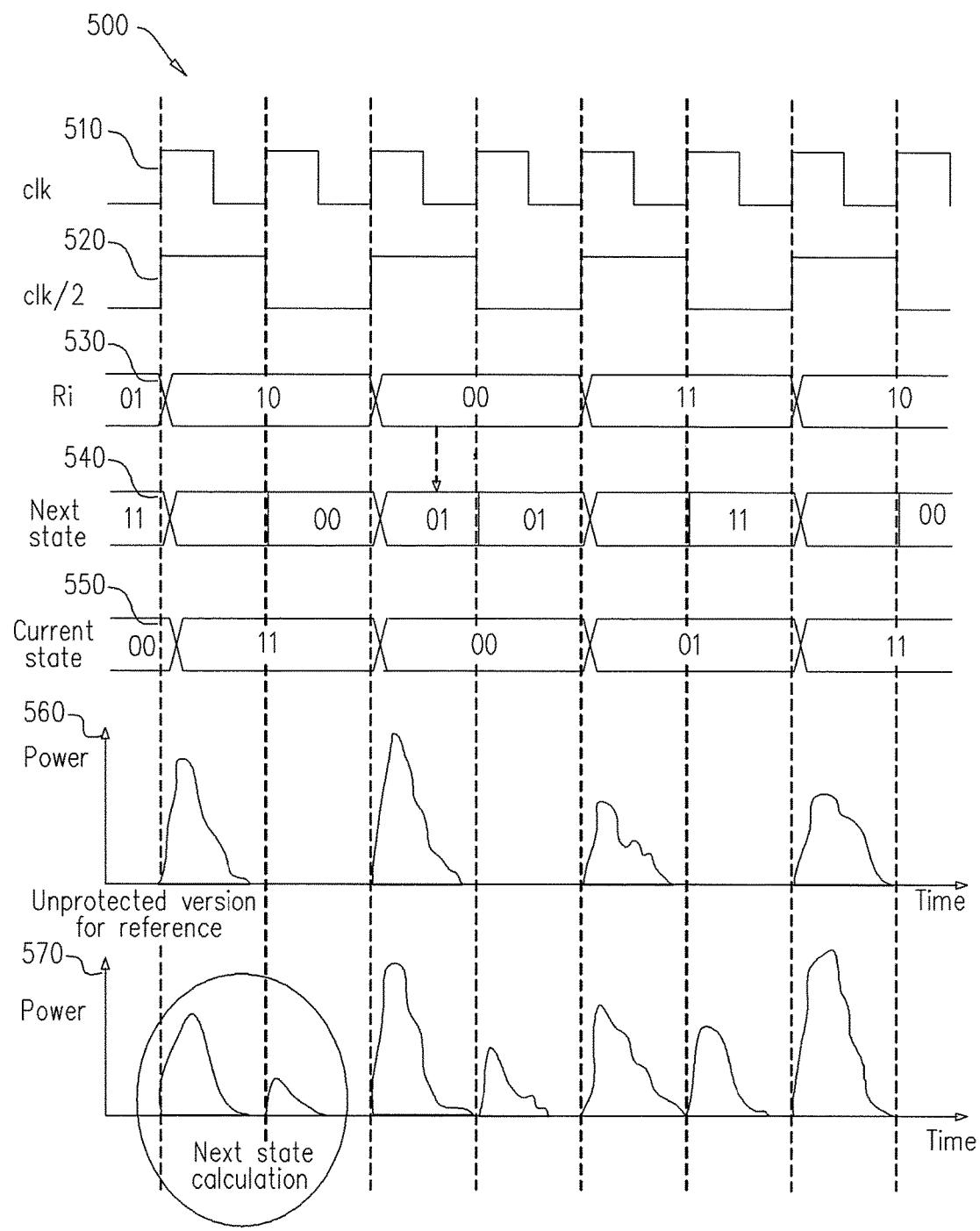
FIG. 5 is a schematic illustration of logic signals and power consumption as a function of time according to an exemplary embodiment of the disclosure.
Figure 6:
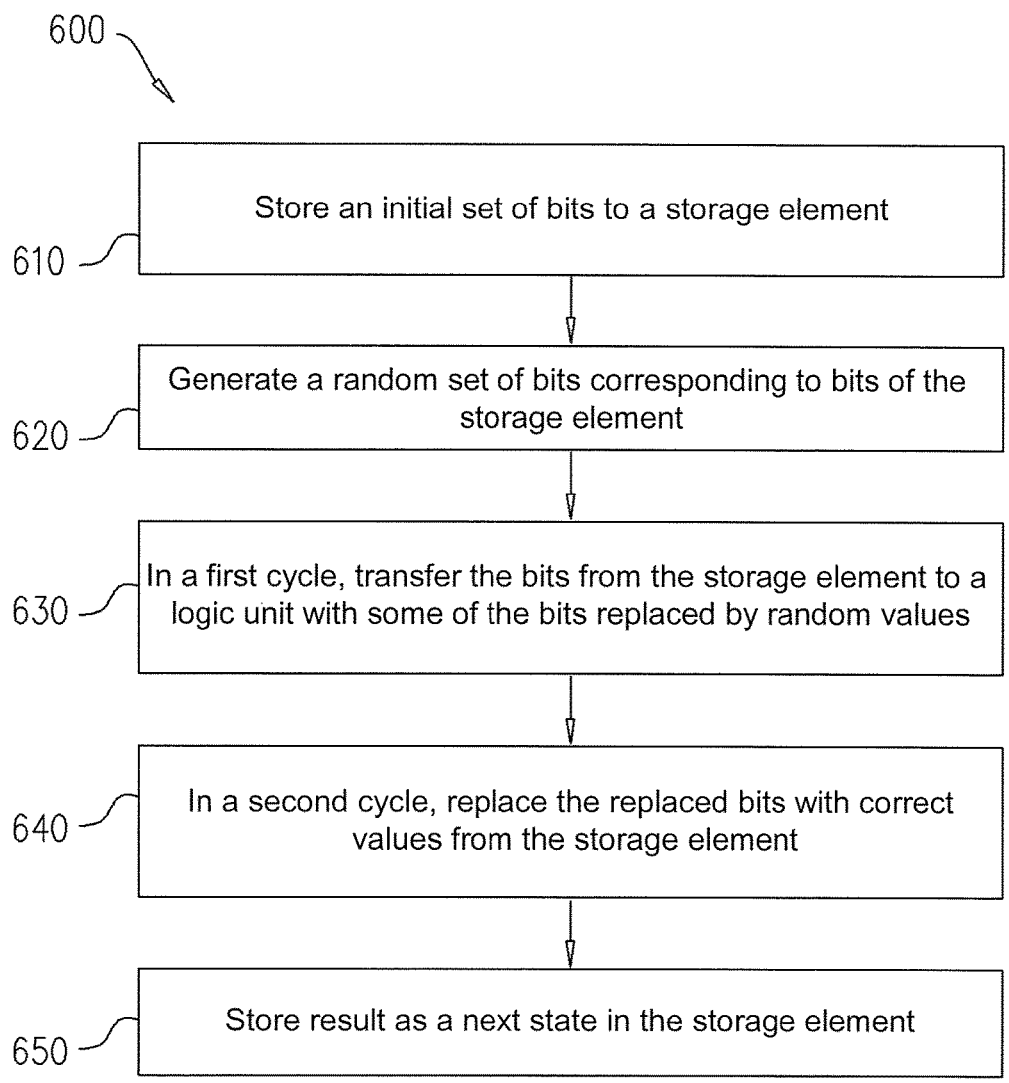
FIG. 6 is a flow diagram of a method of performing logic calculations in two cycles according to an exemplary embodiment of the disclosure.

FIG. 5 is a schematic illustration 500 of logic signals and power consumption as a function of time of the enhanced logic circuit 400 and FIG. 6 is a flow diagram of a method 600 of performing logic calculations in two cycles according to an exemplary embodiment of the disclosure. In an exemplary embodiment of the disclosure, the enhanced logic circuit 400 uses 2 clock signals, one having a clock frequency clk 510 and one having half of the frequency clk/2 520. Optionally, some of the elements of the circuit function at the frequency clk 510 and some function at half the frequency clk/2 520 (over two cycles). In an exemplary embodiment of the disclosure, the logic circuit 400 accepts values of an initial set of bits stored in the flip flops Si into the storage element 420 (step 610). A signal 550 shows an exemplary set of bits stored in the flip flops Si in the enhanced logic circuit 400. Optionally, the random bit generator 440 generates a random set of the bits Ri as shown by a signal 530 to determine which of the bits stored in the flip flops Si are used in the first cycle and which bits are only used in the second cycle (step 620).

In the first cycle, some of the bits stored in the flip flops Si are transferred from storage element 420 to the combinatorial logic unit 410 and some bits are replaced by random values (step 630). The random bits Ri determine which bits are transferred and which are replaced in the first cycle. In the second cycle, all of the bits are transferred from the storage element 420 to the combinatorial logic unit 410 (the random bits are replaced by the real bits) (step 640). Optionally, in the second cycle, fewer bits change from 0 to 1 consuming a lot of power in the combinatorial logic unit 410, since about half are already changed in the previous cycle. The result of the processing by the combinatorial logic unit 410 serve as the next state bits Ni (540) to be stored back into the storage element 420 (step 650).

In an exemplary embodiment of the disclosure, a time line 560 shows a standard power usage by a logic circuit relative to a timeline 570 that shows the power consumption randomly split into two parts over the two cycles. Some of the bits are set correctly in the first cycle and some are only corrected in the second cycle.

Figure 7:
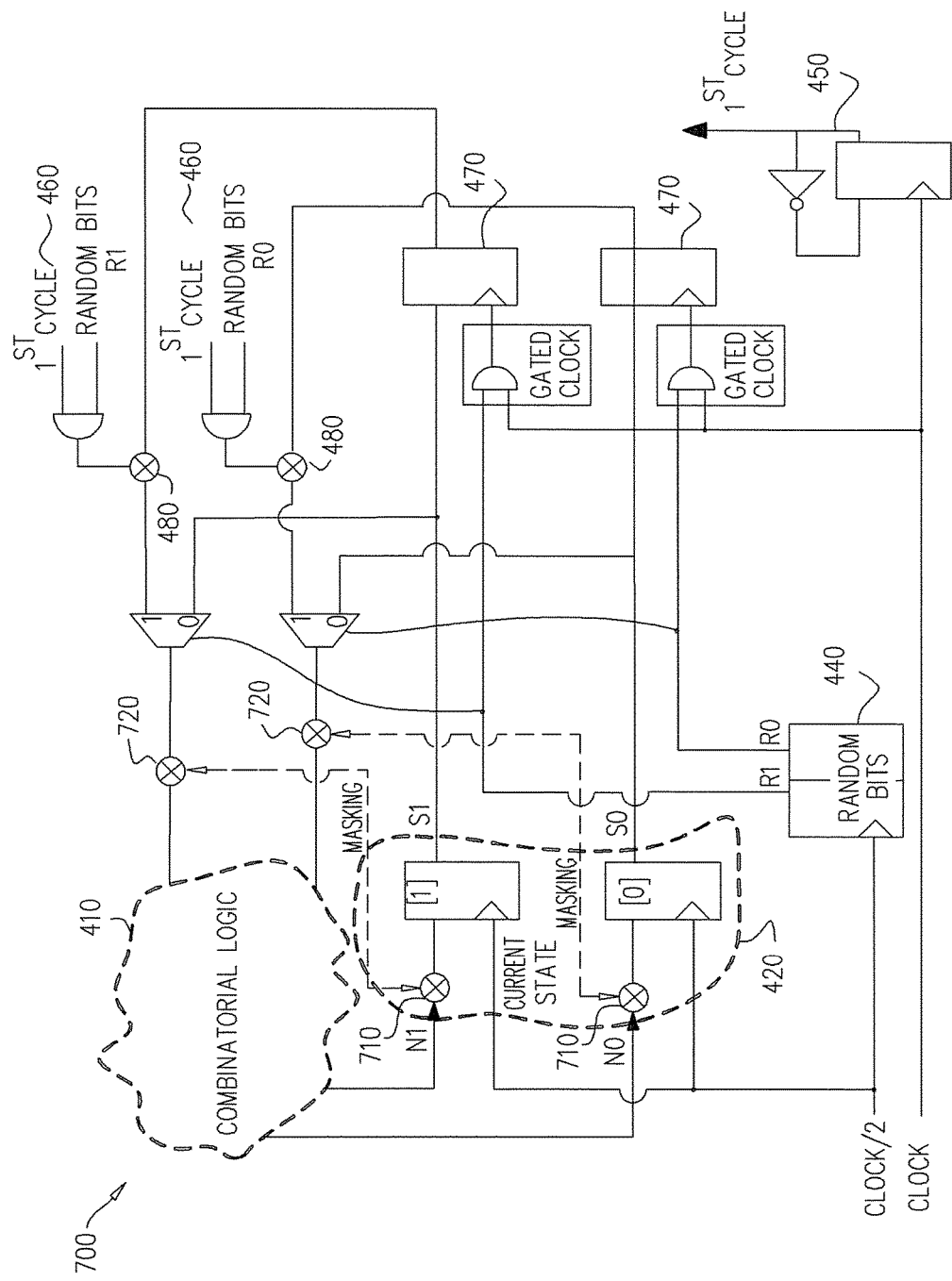
FIG. 7 is a schematic illustration of an enhanced logic circuit of a cryptographic device that also masks the next state according to an exemplary embodiment of the disclosure.

FIG. 7 is a schematic illustration of an enhanced logic circuit 700 of the cryptographic device 110 that also masks the next state bits Ni (540) according to an exemplary embodiment of the disclosure. The enhanced logic circuit 700 is similar to the enhanced logic circuit 400 except that as explained above, the enhanced logic circuit 400 only prevents power analysis of the combinatorial logic unit 410 and not the storage element 420. In the enhanced logic circuit 700, a pair of interconnected XOR gates (710, 720) are used to encrypt and decrypt the data bits that are stored in storage element 420. Optionally, the XOR gate 710 applies a random mask to the next state bits Ni so that the next state bits Ni are randomly encrypted when stored in the storage element 420 to prevent eavesdropping with power analysis. Likewise, the XOR gate 720 applies the random mask to decrypt the bits stored in the flip flops Si when they arrive at the combinatorial logic unit 410, so that the correct data is processed.

Figure 8:
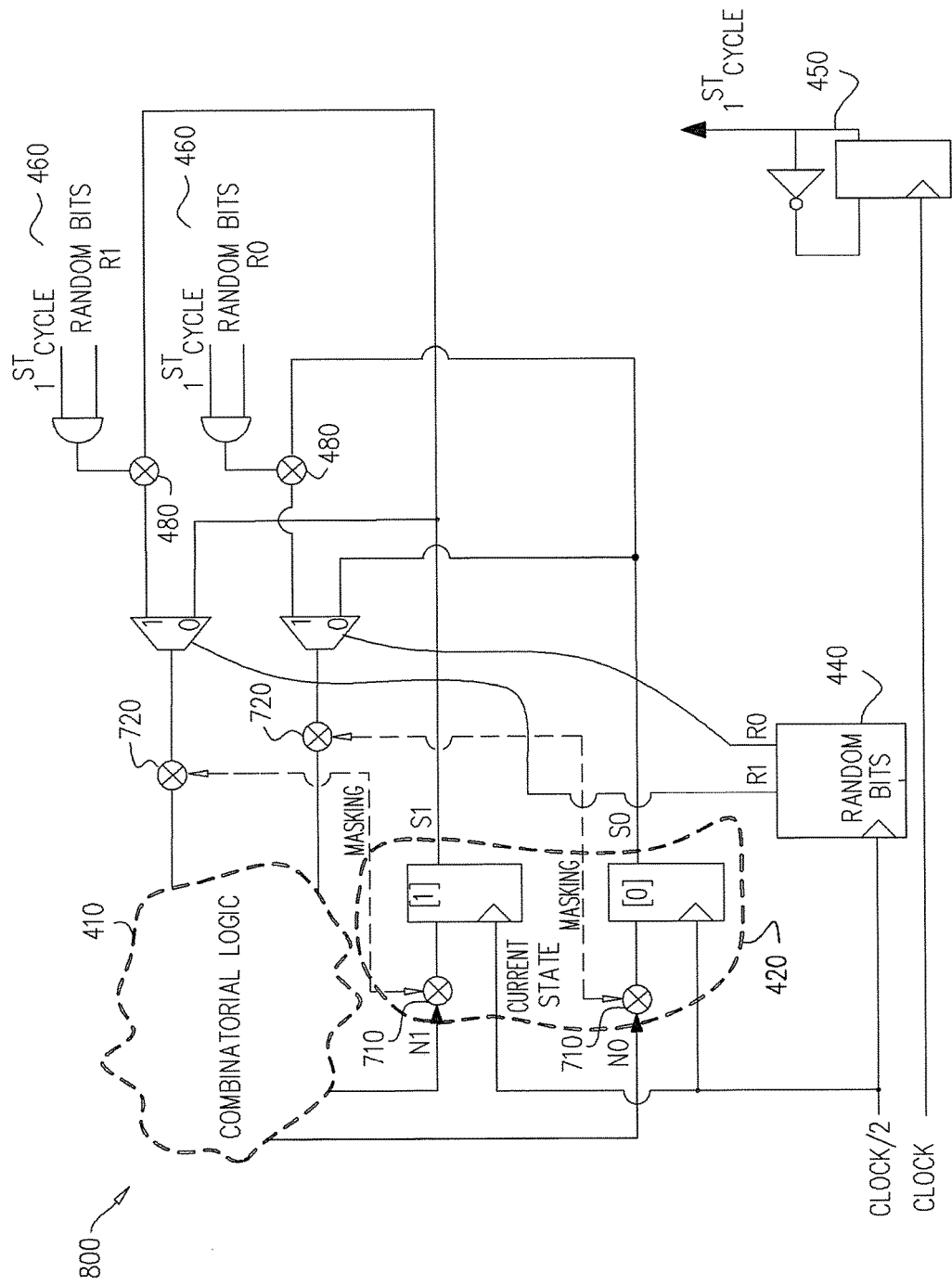
FIG. 8 is a schematic illustration of an alternative enhanced logic circuit of a cryptographic device that also masks the next state according to an exemplary embodiment of the disclosure.

FIG. 8 is a schematic illustration of an alternative enhanced logic circuit 800 of a cryptographic device that also masks the next state according to an exemplary embodiment of the disclosure. The enhanced logic circuit 800 is similar to the enhanced logic circuit 700 except that it is implemented without intermediate storage units 470.

In an exemplary embodiment of the disclosure, the enhanced logic circuit 400 may be designed to support three or more cycles in a similar manner as described above, for example changing some of the bits to the correct values in the first cycle, changing some bits in the second cycle and changing some bits in a third cycle. Optionally, each cycle may introduce the same number of correct bits.

It should further be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure. It will also be appreciated by persons skilled in the art that the present disclosure is not limited to what has been particularly shown and described hereinabove.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An electronic circuit with protection against eavesdropping by power analysis, comprising:
   a storage element, configured to store a set of bits;
   a random bit generator, configured to generate random bits corresponding to the stored set of bits respectively;
   a selector, coupled to the storage element and the random bit generator, configured to output at least one replaced bit by replacing at least one bit of the stored set of bits with a random value or an opposite value according to the random bits;
   a combinatorial logic unit, coupled to the selector, configured to perform logic calculations in at least two cycles and provide a next state set of bits after the at least two cycles to the storage element, wherein the combinatorial logic unit is configured to perform a first logic calculation on the output of the selector including the at least one replaced bit under a first distribution of power consumption in a first cycle, and is configured to perform a last logic calculation on all of the stored set of bits under a second distribution of power consumption in a last cycle, and wherein the combinatorial logic unit is configured to obtain some of the stored initial set of bits from the storage element in the first cycle and replacing the rest of the bits which have been replaced by the random values in the first cycle with the corresponding bits of the stored initial set of bits after the first cycle and before the last cycle.

2. The electronic circuit according to claim 1, wherein the electronic circuit is driven by two clock signals, and one of the clock signals is with half a frequency of the other, and the first distribution of power consumption is different from the second distribution of power consumption.

3. The electronic circuit according to claim 1, further comprising an intermediate storage unit associated with the storage element for storing the stored set of bits for use in the last cycle.

4. The electronic circuit according to claim 1, wherein the selector is controlled by the random bits to select between the random value provided by the random bit generator and a corresponding one bit of the stored set of bits.

5. The electronic circuit according to claim 1, wherein the stored set of bits are stored in the storage element in an encrypted form.

6. The electronic circuit according to claim 5, wherein the stored set of bits are decrypted when provided to the combinatorial logic unit.

7. The electronic circuit according to claim 1, wherein in a second cycle, the at least one replaced bit is further replaced with a correct value coming from the at least one bit of the stored set of bits and provided to the logic combinatorial unit.

8. The electronic circuit according to claim 1, wherein half of the stored set of bits are replaced by the random values provided by the random bit generator in the first cycle.

9. The electronic circuit according to claim 1, wherein a random number of the stored set of bits are replaced by the random values provided by the random bit generator in the first cycle.

10. The electronic circuit according to claim 1, wherein the at least one replaced bit that is randomly selected is set to be the opposite value of a corresponding one bit of the stored set of bits.

11. A method of protecting an electronic circuit against eavesdropping by power analysis, comprising:
    storing an initial set of bits corresponding to correct values to a storage element;
    generating, by a random bit generator, random bits corresponding to the stored initial set of bits respectively;
    replacing at least one bit of the stored initial set of bits with a random value or an opposite value according to the random bits by a selector;
    performing logical calculations in at least two cycles by a combinatorial logic unit, wherein, in a first cycle of the at least two cycles, performing a first logical calculation on an intermediate set of bits including the at least one replaced bit and a part of the stored initial set of bits under a first distribution of power consumption; and
    in a last cycle of the at least two cycles, performing a last logical calculation on all of the stored initial set of bits under a second distribution of power consumption to provide a next state set of bits;
    storing the next state set of bits to the storage element; and
    obtaining some of the stored initial set of bits from the storage element in the first cycle and replacing the rest of the bits which have been replaced by the random values in the first cycle with the corresponding bits of the stored initial set of bits after the first cycle and before the last cycle.

12. The method according to claim 11, wherein the electronic circuit is driven by two clock signals, and one of the clock signals is with half a frequency of the other.

13. The method according to claim 11, further comprising storing the initial stored set of bits for use in the last cycle to an intermediate storage unit associated with the storage element.

14. The method according to claim 11, wherein the first distribution of power consumption is different from the second distribution of power consumption.

15. The method according to claim 11, wherein the step of storing the initial set of bits further comprises encrypting the initial stored set of bits.

16. The method according to claim 15, wherein the step of in the last cycle of the at least two cycles, performing the last logical calculation on all of the stored initial set of bits further comprises decrypting the stored initial set of bits before performing the last logical calculation.

17. The method according to claim 11, wherein half of the stored initial set of bits are replaced by the random values provided by the random bit generator in the first cycle.

18. The method according to claim 11, wherein a random number of the stored initial set of bits are replaced by the random values provided by the random bit generator in the first cycle.

19. The method according to claim 11, wherein the at least one replaced bit that is randomly selected is set to be the opposite value of a corresponding one bit of the stored set of bits.

* * * * *